United States Patent Office 3,291,755
Patented Dec. 13, 1966

3,291,755
CATALYTIC DEHYDROGENATION CATALYST
FOR PARAFFINIC HYDROCARBONS
Vladimir Haensel, Hinsdale, and James Hoekstra, Evergreen Park, Ill., assignors to Universal Oil Products Company, Des Plaines, Ill., a corporation of Delaware
No Drawing. Filed Feb. 14, 1966, Ser. No. 527,051
4 Claims. (Cl. 252—464)

The present invention relates to a process for effecting the dehydrogenation of saturated hydrocarbons to produce unsaturated hydrocarbons. More specifically, the invention herein described is directed toward a catalytic process for the dehydrogenation of a paraffinic hydrocarbon to the corresponding olefinic hydrocarbon, which process increases the degree and efficiency of paraffin conversion, and simultaneously decreases the degree to which undesirable side reactions such as isomerization take place. Through the practice of the present invention, and the use therein of a novel catalytic composite, an extended period of operation is afforded during which time the catalyst exhibits acceptable stability as a result of decreased carbon deposition thereupon.

The present invention is most advantageously applied to a process for the dehydrogenation of propane, n-butane, isobutane, n-pentane, isopentane and various paraffinc hydrocarbons containing six or more carbon atoms per molecule, all of which may be successfully dehydrogenated to form the corresponding olefinic hydrocarbons. In many instances, with certain modifications which will be apparent to those having skill in the art of petroleum processing techniques, a variety of cycloparaffins may be dehydrogenated to produce the corresponding cycloolefins.

The uses of various olefinic hydrocarbons are numerous, and are applied with success in a wide variety of industries including the petroleum, petrochemical, heavy chemical, pharmaceutical, plastics industry, etc. For example, propylene is utilized in the manufacture of isopropyl alcohol, propylene dimer, trimer and tetramer, cumene, polypropylene, and in the synthesis of isoprene. Butene-1, cis-butene-2, and trans-butene-2 are extensively used in polymer and alkylate gasolines, in the manufacture of polybutenes, butadine, aldehydes, alcohols, cross-linking agents for polymers, and in the synthesis of various $C_4$ and $C_5$ derivatives. Isobutane finds use in the production of iso-octane, butyl rubber, polyisobutene resins, tertiary butyl chloride, copolymer resins with butadiene, acrylonitrile, etc. Pentenes are primarily employed in organic synthesis, although alpha-n-amylene (1-pentene) is often used as a component blending agent for high octane motor fuel.

In order that a dehydrogenation process might achieve commercial success, the use of a suitable dehydrogenation catalyst is required. The thermal conversion of paraffins, to the corresponding olefins, can be carried out provided a sufficiently high temperature is utilized. However, due to high temperature pyrolysis, the main reaction is cracking which becomes undesirable from the standpoint of product quality and yield. At temperatures sufficiently low to avoid the deleterious cracking reactions, little or no conversion of paraffins takes place. The use of suitable dehydrogenation catalysts avoids this difficulty by permitting relatively low temperature operation for dehydrogenation, while avoiding excessive cracking. The prior art processes for dehydrogenation are replete with examples of numerous catalysts which can be used in promoting the low temperature conversion of paraffins to olefins. Such catalysts generally consist of one or more metallic components from the metals of Groups VI and VIII of the Periodic Table, and compounds thereof. These catalysts are employed either unsupported, and generally in powder or small particle form, or supported or carried by a suitable refractory inorganic oxide material. Thus, suitable catalytic composites have been found to comprise one or more components selected from chromium, tungsten, molybdenum, iron, cobalt, nickel, platinum, palladium, iridium, ruthenium, rhodium, osmium, and various compounds thereof. These are generally composited with a carrier material comprising one or more inorganic oxides from the group of alumina, silica, zirconia, magnesia, thoria, hafnia, titania, boria, etc. Notwithstanding the wide variety of dehydrogenation catalysts, it becomes evident, from a perusal of the prior art, that any proposed catalyst appears to possess inherently one or more drawbacks which detract from the suitability and acceptability thereof. Some catalysts are too active, and to the extent that undesirable side reactions are promoted even at low temperatures. Others are too inactive at low temperatures to promote an acceptable degree of dehydrogenation. Still others are insufficiently stable to be effective for an extended period of time, and, as such, do not foster a commercially attractive process.

In conjunction with the various difficulties involved in selecting a suitable catalyst, there is the aspect of reaction equilibrium to consider. Dehydrogenation is generally effected at conditions including a temperature in the range of from 400° C. to about 700° C., a pressure from 0 to 100 pounds per square inch gauge, a liquid hourly space velocity within the range of from about 1.0 to about 10.0, and in the presence of hydrogen in an amount to result in a mol ratio of from 1:1 to about 10:1, based upon the paraffin charge. When operating at or extremely close to equilibrium conversion, regardless of the character of the catalyst being used or the degree to which it successfully promotes dehydrogenation, various side reactions, including at least some cracking, are also effected. For instance, in the dehydrogenation of isobutane, at close to equilibrium conditions, a significant degree of isomerization to n-butane results. This, as well as other side reactions obviously detrimentally affect the efficiency of conversion of isobutylene, and tend to adversely affect the economic considerations of the process.

An object of the present invention is to provide a paraffin dehydrogenation process which can function at close to equilibrium without suffering from an excessive degree of side reactions leading to decreased efficiency, excessive cracking which results in the over-production of waste gases, or the deposition of carbon onto and within the catalyst, thereby shielding the active surfaces and centers thereof from the material being processed.

Another object of the present invention is to provide a novel four-component catalytic composite of an inorganic oxide carrier material, an alkali metal component, a Group VIII metal component and a catalytic attenuator from the group consisting of arsenic, antimony and bismuth.

Therefore, in a broad embodiment, the present invention relates to a process for the dehydrogenation of a paraffinic hydrocarbon, which process comprises contacting said hydrocarbon with a catalytic composie of lithiated alumina, a Group VIII metallic component and a metallic component selected from the group consisting of arsenic, antimony, bismuth and compounds thereof, at dehydrogenating conditions including a temperature within the range of from about 400° C. to about 700° C.

This process is further characterized in that a particularly preferred catalyst comprises lithiated alumina containing from about 0.05% to about 5.0% by weight of a Group VIII noble metal, and especially platinum. Although beneficial results are obtained at temperatures from about 400° C. to about 700° C., it is preferable to operate within an intermediate temperature range of from about 525° C. to 625° C. The pressure will be in the range of 0 to about 100 p.s.i.g., and most normally at least about 10 p.s.i.g., but not substantially above 40 p.s.i.g. The pressure will be maintained upon the reaction zone by compressive hydrogen recycle in an amount such that the mol ratio of hydrogen to hydrocarbon charge is within the range of about 1:1 to about 10:1, the hydrocarbon charge being sufficient to result in a liquid hourly spaced velocity (defined as volumes of hydrocarbon charge per volume of catalyst disposed in the reaction zone) of from 1.0 to about 10.0.

The fourth component of the catalytic composite is selected from the group consisting of arsenic, antimony, bismuth and compounds thereof. Of these, arsenic and antimony are preferred, and arsenic is particularly preferred. These catalytic attenuators are employed in amounts based upon the concentration of the Group VIII metallic component. For example, arsenic is present in an atomic ratio to platinum within the range of from 0.20 to about 0.45.

Thus, another embodiment of the present invention involves a catalytic composite of alumina, lithium, 0.05% to 5.0% by weight of platinum and arsenic in an atomic ratio to said platinum of from about 0.20 to about 0.45. It is understood that regardless of the precise form in which the various catalytic components exist, the concentrations are calculated as if they exist within the composite as the elemental metals.

The particularly preferred dehydrogenation catalyst, employed in the process of the present invention, makes use of a non-acidic, and especially halogen-free, refractory inorganic oxide carrier material. It is understood that alumina can properly be considered, under certain circumstances, to possess acidic properties; it reacts, for example, with strong bases. However, the term "non-acidic" is intended to preclude the use of those inorganic oxides which possess the acidic function characteristic of material which fosters cracking reactions. This is combined with a Group VIII noble metal component, an alkali metal component and a catalytic attenuator as above described. In some instances, the catalyst will contain an alkaline-earth metal component, including calcium, magnesium and/or strontium, although the alkali metals, cesium, rubidium, potassium, sodium and especially lithium are preferred. The Group VIII noble metal, palladium, iridium, ruthenium, rhodium, osmium, and especially platinum, may exist within the composite as the element, as a chemical compound, or in physical association with the other catalyst components. In any event, the Group VIII metal will be in an amount of from about 0.05% to about 5.0%, calculated as if existing as the elemental metal. The alkali metals will be utilized in an amount not generally exceeding 5.0% by weight; in order to achieve a proper balance between inhibiting the occurrence of side reactions, and imparting the desired degree of stability, the alkali metals will be used in significantly lower concentrations. Therefore, they will be present in a concentration within the range of from about 0.01% to about 1.5% by weight, calculated as the element. It is preferable to utilize alumina as the carrier material, without the addition thereto of acidic components which promote hydrocracking reactions. The utilization of any other inorganic oxide, in combination with the alumina, is usually dependent upon the desire to impart thereto certain physical and/or chemical characteristics.

The catalyst for use in the present process may be prepared in any suitable manner, and it is understood that the particular method chosen is neither essential to, nor limiting upon the present invention. In general, the alumina carrier material will be prepared and formed into the desired size and shape. The alkali metal, or alkaline-earth metal is added as an aqueous solution thereof, and thus may comprise a chloride, sulfate, nitrate, acetate, such as lithium nitrate, etc. Similarly, the platinum components may be composited in any suitable manner, one particularly convenient method involving the use of an impregnating solution of a water-soluble platinum compound such as chloroplatinic acid. The impregnated carrier is then dried at a temperature of from 100° F. to 300° F., and thereafter subjected to a calcination treatment at an elevated temperature of from 800° F. to about 1100° F.

An essential feature of the present invention involves the simultaneous use of a fourth catalytic component with the platinum and lithiated alumina. As hereinbefore set forth, this fourth component is selected from the group consisting of arsenic, antimony, bismuth, and compounds thereof. Of these, arsenic appears to yield the better results in most situations, and possesses an unusual affinity for the platinum, such that it remains within the catalytic composite for an extended period of time while processing the paraffinic charge stock. On the other hand, bismuth is least preferred since it appears to be most prone to removal from the composite during processing.

Although it can be shown that supported platinum-containing catalysts are very active in promoting the dehydrogeneration of paraffinic hydrocarbons, they inherently possess additional, objectionable properties which stem from the overall activity and ability which platinum has for promoting other types of reactions. The alkali metal component effectively inhibits a substantial amount of the cracking reactions, by neutralizing at least a portion of the inherent acid function possessed by platinum, however, sufficient cracking activity remains such that higher temperature operation to increase conversion is precluded. Furthermore, there still is present inherent capability of the platinum to promote undesirable isomerization reactions. This is still further compounded by the fact that where higher temperature operation can be afforded to increase conversion without a substantial increase in cracking, there exists an accompanying increase in the tendency to promote isomerization. Thus, at a given temperature and conversion level, the addition of lithium for the purpose of decreasing cracking activity to permit increasing temperature to increase conversion of the paraffinic hydrocarbon falls short of economic acceptability due to the increased tendency toward isomerization, whereby the efficiency of conversion to the corresponding olefin suffers.

The primary function of the catalytic attenuator, arsenic, antimony or bismuth, is actually two-fold, although the intended effect is the same. That is, the catalyst attenuator is specifically intended to poison the platinum to the extent that the remaining cracking activity thereof is virtually completely curtailed, and the tendency to promote isomerization reactions is substantially eliminated. The uniqueness of these attenuators resides in the fact that the dehydrogenation activity of the platinum component is not affected. As hereinafter indicated in a specific example, the doping action of the attenuator is highly selective in this regard. There is actually no dehydrogenation activity supplied by the attenuator, but rather a doping or poisoning effect directed toward two specific side reactions which the platinum component is otherwise capable of promoting. Where two catalysts were prepared, one with an arsenic attenuator, the other with one-half the quantity of platinum and no attenuator, the conversion in the case of the second catalyst decreased more than the cracking, whereas the attenuated catalyst inhibited cracking without decreasing conversion. Furthermore, there was a decrease in the degree to which isomerization of the paraffinic hydrocarbon was experienced.

Another advantage of the attenuated catalyst resides in the decreased production of undesirable diolefins. The use of the attenuator modifies the ratio in which the two dehydrogenation steps are effected, whereby the primary stage leading to the mono-olefin is not affected, but the secondary stage, resulting in the di-olefin, is reduced in intensity. There is also a suppression of the tendency for the mono-olefins to undergo polymerization, the products from which become deposited within and through-out the catalytic composite, thereby shielding the catalytically active sites from the material being processed. Through the increased conversion, the increased efficiency of conversion to the mono-olefin, and the increased stability of the catalytic composite, the overall beneficial effect resides in the resulting economic considerations involved in the effective catalyst life and the total quantity of desired olefin produced.

The following examples are presented for the purpose of illustrating the dehydrogenation process hereinbefore described and to indicate the benefits derived through the utilization thereof. It is not intended to limit the scope of the invention, as defined by the appended claims, to the catalyst, operating conditions, concentrations, charge stock, etc., used in these examples. Modification of these variables, within the aforesaid limits, may be made by those skilled in the art of petroleum refining operations, in order to achieve optimum economic advantage in a given situation.

The charge stock employed was commercial grade (99.0%) isobutane; an analysis of this stock indicated an isobutane content of 99.7%, with 0.3% normal butane being present. Analyses on the product gas stream were made by gas chromatography, and the concentrations reported in mol percent. Values for conversion and efficiency were obtained by converting the $C_3$ and lighter components of the hydrocarbon portion to their equivalent $C_4$ values, and adjusting the values to a basis of 100.0%. The conversion of isobutane is the difference between the residual isobutane and 100, and the efficiency is the net isobutylene produced divided by the conversion.

In all the examples which follow, the catalyst was disposed, in an amount of 25 cc., in a stainless steel tube of ⅞-inch nominal inside diameter, equipped with an inner spiral preheater. The operating conditions included a temperature of 575° C., a pressure of 10 p.s.i.g., the liquid hourly space velocity was either 2.0 or 4.0, and hydrogen was introduced with the charge in a mol ratio of 2:1, with respect to said charge. The non-attenuated catalyst was a commercially available alumina carrier which had been impregnated with chloroplatinic acid and lithium nitrate to yield a finished catalyst containing 0.75% or 0.375% by weight of platinum and 0.33% or 0.5% by weight of lithium. When this catalyst was doped with an attenuator, for example arsenic, an ammoniacal solution of an oxide, $As_2O_5$, was employed in an amount to give the desired atomic ratio of arsenic to platinum. The incorporation of the arsenic component was made by impregnating the lithiated alumina platinum composite, followed by drying at about 210° F. and calcination in a muffle furnace for two hours at a temperature of 932° F. It is understood that the catalyst may be prepared in any suitable manner, and that no particular method is either essential to, or limiting upon the present invention.

EXAMPLE I

In this example, as well as those following, each individual test period was of 21 hours duration, with analyses being made during the first and twenty-first hours. A first test period at 10.0 p.s.i.g., 575° C., a 2:1 hydrogen to hydrocarbon mol ratio, and a liquid hourly space velocity of 2.0, using a non-lithiated alumina composite containing 0.75% by weight of platinum, resulted in an isobutane conversion to isobutylene of 23.8% during the first hour. The efficiency of conversion to isobutylene was 57.1%, and considerable cracking to $C_1$–$C_3$ paraffins was observed since 3.5 mol percent methane, 3.5 mol percent ethane and 10.9 mol percent propane was produced; also, the catalyst indicated the deposition thereon of 3.61% by weight of carbon.

A second test period, without changing the conditions of operation but with the platinum catalyst containing 0.33% by weight of lithium, resulted in a conversion to isobutylene of 29.2% (during the first hour), accompanied by an efficiency of conversion of 75.4%. The light paraffins indicated 2.4 mol percent methane, 0.9 mol percent ethane and 6.2 mol percent propane, and the catalyst analysis indicated carbon deposition of 0.85% by weight. Of interest is the fact that, at the twenty-first hour, the isobutylene conversion decreased only to 29.0%, but the efficiency of conversion increased to 91.5%. Furthermore, the cracking reactions decreased to the extent that only 0.7% methane, a trace quantity of ethane and 2.0% propane were produced.

A third test period, in which the catalyst contained arsenic in an atomic ratio to platinum of 0.31, the latter present in an amount of 0.75% by weight, alumina and 0.5% by weight of lithium, was performed under the same conditions of operation, with one exception. The residence time of the isobutane feed was decreased by increasing the liquid hourly space velocity to 4.0 from the 2.0 used in the two previous test periods. During the first hour, the isobutane conversion was 30.0%, and only decreased to 29.8% during the twenty-first hour. The yield of isobutylene during the twenty-first hour was 29.1%, for an efficiency of conversion of 97.7%. The addition of the arsenic to the lithiated alumina-platinum catalyst virtually eliminated isomerization and cracking reactions, since the total light paraffins, $C_1$–$C_3$, was 0.7%, and only 0.33% by weight of carbon was found on the catalyst.

The results obtained during the third test period are even more surprising in view of the fact that the liquid hourly space velocity was double that employed during the first two test periods. The following Table I summarizes the results during the first hour of these three test periods:

Table I

| | Period No. | | |
|---|---|---|---|
| | 1 | 2 | 3 |
| Catalytic Components on Alumina | Pt | Pt-Li | Pt-Li-As |
| Conversions, mol percent: | | | |
| Of Isobutane | | | 30.0 |
| To Isobutylene | 23.8 | 29.2 | 29.1 |
| Efficiency of Conversion | 57.1 | 75.4 | 97.7 |
| Light Paraffins Produced, mol percent: | | | |
| Methane | 3.5 | 2.4 | |
| Ethane | 3.5 | 0.9 | 0.7 |
| Propane | 10.9 | 6.2 | |
| Carbon on Catalyst, Percent | 3.61 | 0.85 | 0.33 |

EXAMPLE II

In order to attempt to determine the effect which the attenuators have upon the platinum component, three test periods were performed at operating conditions of 10.0 p.s.i.g., a temperature of 575° C., a hydrogen to hydrocarbon mol ratio of 2.0 and a liquid hourly space velocity of 4.0. The three catalysts employed were: (a) alumina, 0.5% by weight of lithium, 0.75% by weight of platinum, and arsenic in an atomic ratio to platinum of 0.31; (b) alumina, 0.5% by weight of lithium and 0.75% by weight of platinum; and (c) alumina, 0.5% by weight of lithium and 0.375% by weight of platinum. The results are presented in the following Table II:

Table II

| Catalyst Designation | A | B | C |
|---|---|---|---|
| Platinum, wt. percent | 0.75 | 0.75 | 0.375 |
| Arsenic, Atomic Ratio | 0.31 | 0 | 0 |
| Lithium, wt. percent | 0.50 | 0.50 | 0.50 |
| Conversions, mol. percent: | | | |
| Of Isobutane | 29.8 | 23.2 | 15.7 |
| To Isobutylene | 29.1 | 21.6 | 14.5 |
| Efficiency | 97.7 | 93.2 | 92.4 |
| Light Paraffins Produced, mol percent | 0.7 | 1.6 | 1.2 |
| Carbon Deposition, wt. percent | 0.33 | 0.51 | 0.08 |

All the results given in Table II are those obtained during the twenty-first hour of each test period. Upon comparing catalysts (B) and (C), when the platinum content is halved, it is noted that the overall activity of the catalyst decreases, although efficiency does not appear to be substantially affected, and that conversion has decreased more than cracking. Upon comparing catalyst (A) and (B), the addition of arsenic is seen to result in a very substantial decrease in cracking, but no decrease in the conversion or efficiency. This leads to the conclusion that the effect of arsenic is very selective, and not merely one of removing platinum from total catalytic action.

EXAMPLE III

Five test periods, each of twenty-one hours duration, were performed at operating conditions of 10.0 p.s.i.g., a temperature of 575° C., a hydrogen to hydrocarbon mol ratio of 2.0 and a liquid hourly space velocity of 4.0. Five different catalytic compositions were tested, each of which containing 0.5% by weight of lithium and 0.75% by weight of platinum, but varying concentrations of arsenic. The results are presented in Table III following:

*Table III*

| Catalyst Designation | D | E | F | G | H |
|---|---|---|---|---|---|
| Arsenic Atomic Ratio | 0 | 0.21 | 0.31 | 0.47 | 1.30 |
| Conversions, mol percent: | | | | | |
| Of Isobutane | 23.2 | 27.4 | 29.8 | 22.6 | 5.8 |
| To Isobutylene | 21.6 | 26.4 | 29.1 | 21.7 | 5.3 |
| Efficiency | 93.2 | 96.4 | 97.7 | 96.0 | 91.4 |
| Light Paraffins Produced | 1.6 | 1.0 | 0.7 | 0.9 | 0.5 |
| Carbon Deposition on Catalyst | 0.51 | 0.24 | 0.33 | 0.07 | 0.05 |

All the results appearing in Table III are those observed during the last hour of the 21-hour test period. When considering the quantity of isobutane converted, and the efficiency of the conversion to isobutylene, it is readily ascertained that the attenuator should be present in an amount to result in an atomic ratio to platinum of about 0.20 to about 0.45. When either below, or above this limitation, both the activity and efficiency of the catalyst are adversely affected.

The foregoing specifications and examples indicate the method involved in the process of the present invention, and clearly show the benefits to be afforded through the utilization thereof. Through the use of the present process and catalyst, the dehydrogenation of paraffinic hydrocarbons can be carried out with a substantial degree of conversion, to high efficiency, and for an extended period of time.

We claim as our invention:

1. A catalytic composite which comprises alumina, from about 0.01% to about 1.5% by weight of lithium, from about 0.05% to about 5.0% by weight of a Group VIII metallic component and a metallic component selected from the group consisting of arsenic, antimony, bismuth and compounds thereof in an atomic ratio to the Group VIII metallic component of from about 0.20 to about 0.45.

2. The catalytic composite of claim 1 further characterized in that said Group VIII metallic component is platinum.

3. The catalytic composite of claim 1 further characterized in that said Group VIII metallic component is palladium.

4. A catalytic composite of alumina, from about 0.01% to about 1.5% by weight of lithium, from about 0.05% to about 5.0% by weight of platinum and arsenic in an atomic ratio to said platinum of from about 0.20 to about 0.45.

References Cited by the Examiner

UNITED STATES PATENTS 3,126,426   3/1964   Turnquest et al. ____ 260—683.3

DELBERT E. GANTZ, *Primary Examiner.*

G. E. SCHMITKONS, *Assistant Examiner.*